(12) United States Patent
Spooner et al.

(10) Patent No.: US 12,358,235 B2
(45) Date of Patent: Jul. 15, 2025

(54) METHOD OF FORMING A SHAPED ARTICLE

(71) Applicant: QinetiQ Limited, Farnborough (GB)

(72) Inventors: Christopher Douglas James Spooner, Bracknell (GB); Lloyd Morris Wye, Farnborough (GB); Lyn David Jones, Fleet (GB); Robert Nathan Williams, Farnborough (GB)

(73) Assignee: QINETIQ LIMITED, Hamsphire (GB)

( * ) Notice: Subject to any disclaimer, the term of this patent is extended or adjusted under 35 U.S.C. 154(b) by 284 days.

(21) Appl. No.: 17/630,803

(22) PCT Filed: Jul. 28, 2020

(86) PCT No.: PCT/EP2020/071180
§ 371 (c)(1),
(2) Date: Jan. 27, 2022

(87) PCT Pub. No.: WO2021/023558
PCT Pub. Date: Feb. 11, 2021

(65) Prior Publication Data
US 2022/0274343 A1  Sep. 1, 2022

(30) Foreign Application Priority Data

Aug. 5, 2019 (GB) .................................. 1911147

(51) Int. Cl.
*B29C 65/02* (2006.01)
*B29C 65/00* (2006.01)
*B29K 23/00* (2006.01)
*B29L 11/00* (2006.01)

(52) U.S. Cl.
CPC .............. *B29C 65/02* (2013.01); *B29C 66/71* (2013.01); *B29C 66/8122* (2013.01); *B29K 2023/0625* (2013.01); *B29K 2023/0633* (2013.01); *B29K 2023/0641* (2013.01); *B29K 2023/065* (2013.01); *B29L 2011/0016* (2013.01)

(58) Field of Classification Search
CPC ....... B29C 66/712; B29C 65/02; B29C 66/71; B29C 66/7311; B29K 2023/065
See application file for complete search history.

(56) References Cited

U.S. PATENT DOCUMENTS

| 2,580,762 | A | * | 1/1952 | Grenier | .................. | B65D 59/00 |
| | | | | | | 411/908 |
| 3,284,257 | A | * | 11/1966 | Soloff | ..................... | B29C 65/08 |
| | | | | | | 156/73.1 |
| 4,239,575 | A | * | 12/1980 | Leatherman | ........ | B29C 65/0627 |
| | | | | | | 156/272.4 |
| 5,151,149 | A | * | 9/1992 | Swartz | ................ | B29C 66/1122 |
| | | | | | | 156/499 |

(Continued)

OTHER PUBLICATIONS

International Searching Authority, International Search Report and Written Opinion mailed on Oct. 20, 2020, issued in connection with International Patent Application No. PCT/EP2020/071180, filed on Jul. 28, 2020, 9 Pages.

*Primary Examiner* — Alison L Hindenlang
*Assistant Examiner* — Debjani Roy
(74) *Attorney, Agent, or Firm* — MCDONNELL BOEHNEN HULBERT & BERGHOFF LLP

(57) ABSTRACT

A method of forming shaped articles by welding.

19 Claims, 3 Drawing Sheets

(56) References Cited

U.S. PATENT DOCUMENTS

| | | | | |
|---|---|---|---|---|
| 6,318,990 B1* | 11/2001 | Gellert | ............... | B29C 45/27 |
| | | | | 425/549 |
| 2004/0256537 A1* | 12/2004 | Richards | ............ | B29C 45/7312 |
| | | | | 249/79 |
| 2006/0182910 A1* | 8/2006 | Wu | ..................... | B29C 48/07 |
| | | | | 428/35.7 |
| 2010/0221063 A1* | 9/2010 | Hardison, III | ...... | B29C 65/5021 |
| | | | | 156/60 |
| 2019/0352503 A1* | 11/2019 | Cheng | ................. | C08L 71/123 |

\* cited by examiner

METHOD OF FORMING A SHAPED ARTICLE

The present application is a national stage entry of PCT/EP2020/071180 filed on Jul. 28, 2020, which claims priority to Great Britain Patent Application No. 1911147.5 filed Aug. 5, 2019, the contents of each of which are hereby incorporated by reference.

FIELD OF THE INVENTION

The present invention relates to a method of welding parts together to form a shaped article. More particularly, the present invention relates to a method of welding thermoplastic polymer parts together to form a shaped multilayer article.

BACKGROUND OF THE INVENTION

The assembly of parts to form a complex shaped article or product presents a number of challenges particularly when a high level of precision is involved and/or it is required to maintain desired properties at the interface between parts and in the main body thereof. Such a level of precision may be required in preparing so called Radio Frequency (RF) products. RF products are generally taken to mean devices or products which operate in the radio wave region of the electromagnetic spectrum, with wavelengths longer than infrared light. They have frequencies from about 3 kHz to about 300 GHz, and corresponding free space wavelengths from about 100 km to about 1 mm. More recently, the terahertz frequency domain is being used. Terahertz is typically defined as the frequency range of 100 GHz to 30 THz with corresponding free space wavelengths of 3 mm to 0.01 mm. Particular types of lens may also operate within this range of the spectrum. Examples of RF products include multilayer products such as radomes, RF lenses (e.g. a Luneburg lens), retro-reflectors, RF waveguides, RF filters, RF resonators, metamaterial structures, refraction structures, diffraction structures, or scattering structures.

Certain applications may require the various layers forming the products or lenses to possess different material properties, e.g. being able to control the permittivity is desirable for many RF products. The product or article may therefore comprise a number of layers of varying chemical constitution and/or shape which must be made separately. The parts may be complex in shape, e.g. comprising parts of constantly varying section thickness and/or doubly curved surfaces, and a low cost manufacturing process may be required to manufacture the product in large volume and economically and, at the same time, retain a good quality bond between the layers which does not deleteriously affect the material properties of the product.

Injection moulding is a low cost scalable technique for making the various parts of a product such as a lens. However, the parts, which may be made from injection moulding, are limited in section thickness mainly due to the thermal conductivity of polymers and the shrinkage of thermoplastic polymers on solidification and cooling from the melt processing temperature back down to room temperature.

The various parts will therefore require to be chemically bonded and preferably over the whole surface area of the sections representing the interface(s) between different parts. By forming a good chemical bond across the entire interface, certain performance aspects of the part, such as mechanical properties or function, may be improved. The presence of unwanted or unexpected air voids in an RF product, for example, would be expected to adversely affect electrical performance. In addition, degradation of such a product which is not whole surface bonded will occur over time, resulting in the separation of adjoining layers or gas (typically air) and/or moisture ingress into any voids which may be present.

Injection moulded parts are typically assembled to form a shaped article or product by polymer welding techniques such as ultrasonic welding or vibrational welding. In these techniques, energy is directed to the bondline by frictional heating under a clamping force which melts a thin interfacial layer of the part or parts which are typically made from thermoplastic polymers. This allows the polymer to flow and polymer chains of the different parts at the interface to form a chemical bond of high strength. However, it is difficult to provide whole surface bonds using these techniques, i.e. a bond which covers the entire area of the interface formed between different parts. Both ultrasonic welding and vibrational welding require energy intensifier features to be designed into the initial part moulding. These intensifiers melt and flow during welding which can lead to difficulties controlling geometrical tolerances of the interface between the layers and may lead to voids, un-bonded areas and flash if the flow is not carefully controlled. Furthermore, multi-layer complex shaped geometries for functional products such as lenses are not always suitable for use in connection with these techniques and cannot easily be re-designed to accommodate such assembly processes without affecting the function of the part. For example, some parts for use in a lens are too thin for ultrasonic welding, the instant energy of which would damage the part, are the wrong shape to allow energy dispersion in an even manner, are too thick to allow transmission of the energy through the part to the bondline, or are made from soft polymers such as polyolefins which may dampen the energy.

A vibration technique known as spin welding is ideal for radially symmetric parts such as lenses but requires chuck features (e.g. holes or protrusions) to grip the parts to allow one part to be rotated relative to the other and these can disrupt the design geometry of the product and limit the number of layers which can be bonded (leaving holes or protrusions which affect the bondline of the next layer). Laser welding, which requires a transparent surface to be bonded to an absorbing surface, is not possible when seeking to bond parts comprising opaque and/or functional fillers. The presence of functional fillers also increases the melt viscosity and therefore makes it difficult to facilitate adequate material flow in the bondline to provide good adhesive strength.

Over-moulding and/or multi-shot moulding are other known techniques for assembling injection moulded parts. In these techniques, each new layer is injection moulded over the previous moulded layer in a progressively larger mould cavity. These techniques have a number of disadvantages. Moulding a molten polymer over a solidified part of a similar polymer will cause the first part to partially melt. This may deform the geometry at the interface between the two parts, particularly opposite the gate of the injection moulding tool where pressures and temperatures are highest. Polymers of progressively reducing melt temperatures can be used but this limits the number of layers possible. This problem is exacerbated when functional, environmental, or mechanical requirements limit the available polymer choices for use in a functional device. There may not be a sufficient range of polymer families available to meet the desired requirements. This represents a challenge of particular significance for RF products such as lenses, when polymers with low loss tangents are often required to minimise energy loss or absorption of RF energy propagating through the structure. Often, very few polymers are available commercially which meet the low loss requirements. Further, mechanical locking features typically need to be designed into the interface layer of the solidified part(s) to ensure they remain connected during service and these features can disrupt the geometry of the functional product. The tooling required for over-moulding and multi-shot moulding techniques tends to be more complex, difficult to design and expensive than conventional single-shot injection mould tooling. The manufacture of articles by multi-shot moulding is regarded as a specialist process often requiring bespoke equipment for one product design and its use represents a significant barrier to market entry for a given product. It is difficult to compensate for shrinkage with multi-shot moulding and this leads to further difficulties in compensating for shrinkage to control geometry of the final shaped article or product.

Shrinkage can also lead to residual stresses and warpage. In multi-shot tools, the ability to mould more than one identical part in a single machine cycle is limited when compared to single shot moulding. This limits the economies of scale possible.

SUMMARY OF THE INVENTION

It is an object of the present invention to provide a method for welding parts together especially thermoplastic polymer parts (which may be filled, for example with a particulate or fibrous filler material) to address at least some of the afore-mentioned problems and preferably in a manner which allows for cost effective, high throughput processing of products such as thermoplastic (filled) polymer articles formed from constituent polymer parts.

As such, and in a first aspect, the present invention provides a method of forming a shaped article wherein said article comprises at least two parts which are chemically bonded, the method comprising:

assembling at least two non chemically bonded parts in a cavity of a tool to form an assembly of the at least two parts, wherein said cavity is adapted to receive the assembly of at least two parts in the form of the shaped article;

sealing the cavity of the tool;

melting the assembly of at least two parts to chemically bond the at least two parts together to form the shaped article.

By chemically bonded is meant the at least two parts may be bonded by covalent or molecular bonds. Any reference to a chemical bond disclosed herein includes a chemical or molecular bond. The chemical bonding may comprise or consist of covalent or molecular bonds. Therefore, the present invention provides a method of forming a shaped article wherein said article comprises at least two parts which are covalently or molecularly bonded, the method comprising:

assembling at least two parts, which are not covalently or molecularly bonded, in a cavity of a tool to form an assembly of the at least two parts, wherein said cavity is adapted to receive the assembly of at least two parts in the form of the shaped article; sealing the cavity of the tool;

melting the assembly of at least two parts to covalently or molecularly bond the at least two parts together to form the shaped article.

By sealing the cavity of the tool any potential leakage from the tool is minimised or prevented.

In the various aspects of the invention, the shaped article comprises an assembly of the at least two parts which are chemically bonded.

The at least two parts may be melted by the application of heat. The at least two parts may be heated to what is referred to herein as the welding temperature. The shaped article is cooled following chemical bonding of the least two parts. This may be done by leaving the tool and/or shaped article at room temperature and allowing it to cool naturally or it may be exposed to a temperature at less than room temperature in order to speed up cooling.

Typically, the cavity is shaped to match the outer surface profile of the assembly of at least two parts. The cavity may be scaled to be larger than the volume of the assembly of at least two parts at room temperature (for example at about 20° C.) in order to allow for some expansion of the assembly during its transformation into the final shaped article during heating. For example, the cavity may be scaled to be larger in volume than the assembly of the at least two parts at room temperature (e.g. about 20° C.) by about 0.5-6 vol % or about 0.5-3 vol % or about 1-2 vol %.

Advantageously, the at least two non chemically bonded parts are assembled to form an interface between the at least two parts and, following melting, a chemical bond is formed across the entire interface or substantially the entire interface. The percentage of the area of the interface which is bonded may be at least about 90% and up to about 100%. For example, the percentage of the area which is bonded may be at least 92% or at least 98%. The percentage of the area of the interface which is bonded may be up to about 98% or 99%. Pressure may be applied to the assembly of the at least two parts during formation of the chemically bonded shaped article.

Essentially, the tool is provided in more than one part to enable access to the cavity and for the at least two non chemically bonded parts to be assembled in the cavity and subsequently removed.

The at least two chemically bonded parts may each possess different material properties. For example, each part may possess a different permittivity, density, magnetic permeability, conductivity, antimicrobial, catalytic, modulus or colour. The value of the permittivity of the material properties of different parts may be controlled by varying, independently of each other, one or any combination of polymer, filler and relative amounts thereof.

The at least two parts are typically thermoplastic or at least one of the parts is thermoplastic. The at least two parts may be (thermoplastic) polymer comprising a filler material. Examples of suitable polymer are selected from:

polyethylene (PE), polypropylene (PP), Acrylonitrile Butadiene Styrene (ABS), Polyoxymethylene (POM), Poly(methyl methacrylate) (PMMA), Cyclic Olefin Copolymer (COC), Cyclic Olefin Polymer (COP), Ethylene Methacrylate (EMA), Ethylene tetrafluoroethylene (ETFE), Ethylene-vinyl acetate (EVA), Fluorinated ethylene propylene (FEP), Polycarbonate (PC), Liquid Crystal Polymer (LCP), Polyamide (PA), Polyaryletherketone (PAEK), polyamide-imide (PAI), Polybutylene succinate (PBS), Polybutylene terephthalate (PBT), Polyethylene terephthalate (PET), Polyether ether ketone (PEEK), Polyethylenimine (PEI), Polyetherketone (PEK), Polyethylene naphthalate (PEN), Polysulphone (PSU), Polyimide (PI), Poly(lactic acid) (PLA), polymethylpentene (PMP), Polyphenylene Ether (PPE), Polyphenylene sulphide (PPS), Polystyrene (PS), Polyvinyl chloride (PVC), Polyvinylidene fluoride (PVDF), Styrene acrylonitrile (SAN), Thermoplastic polyurethane (TPU).

Polyethylene has been shown to provide particularly good results using this technique and in accordance with the present invention. Polyethylene may be selected from low density polyethylene (LDPE) or linear low density polyethylene (LLDPE) or high density polyethylene (HDPE). LDPE typically possesses a density of 0.917-0.930 g/cm$^3$. LLDPE differs structurally from LDPE due to the absence of long chain branching. HDPE has extremely low levels of chain branching allowing it to solidify with high levels of crystallinity and it typically possesses a density of 0.94-0.96 g/cm$^3$.

The at least two parts, e.g. at least two polymers may comprise a filler or filler material. The amount of filler may be present in an amount of 0 vol % to 60 vol %, preferably 0 vol % to 30 vol %. The amount of filler may be present in an amount of at least 0.5 vol %. The amount of filler or filler material is calculated from the mass ratio of the constituent components in the mixture and the bulk density of the materials. The filler may be selected from ceramics, minerals, metals, metal compounds, polymers, and natural materials such as wood. The filler may be particulate (e.g. spherical, faceted, or platelet) or fibrous in shape.

The at least two parts may be in the form of layers, e.g. polymer layers or filled polymer layers. Any number of the parts may be curved, e.g. doubly curved. By a doubly curved surface is meant a surface which has its radius in simultaneously two planes. Spheres and hemispheres are examples of doubly-curved surfaces. All of the layers in the shaped article may be curved, e.g. doubly curved. Each of the layers may possess different material properties, such as permittivity.

The shaped article may be a functional product filled with various filler constituents to allow it to carry out a function, such as electrically conductive fillers to act as an electrical conductor, magnetic fillers to provide magnetic permeability, or dielectric fillers to influence RF energy for an RF product. For example, the shaped article may be a lens, e.g. a multilayer lens, e.g. a beam forming lens, e.g. a Luneburg lens. The lens may comprise or consist of curved layers. At least one, or any combination, of the layers may be doubly curved. Each of the layers may possess a different permittivity or permeability.

BRIEF DESCRIPTION OF THE DRAWINGS

This and other aspects of the present invention will now be described in more detail, with reference to the appended drawing(s) showing embodiments(s) of the invention.

DETAILED DESCRIPTION OF THE INVENTION

Figure 1A:
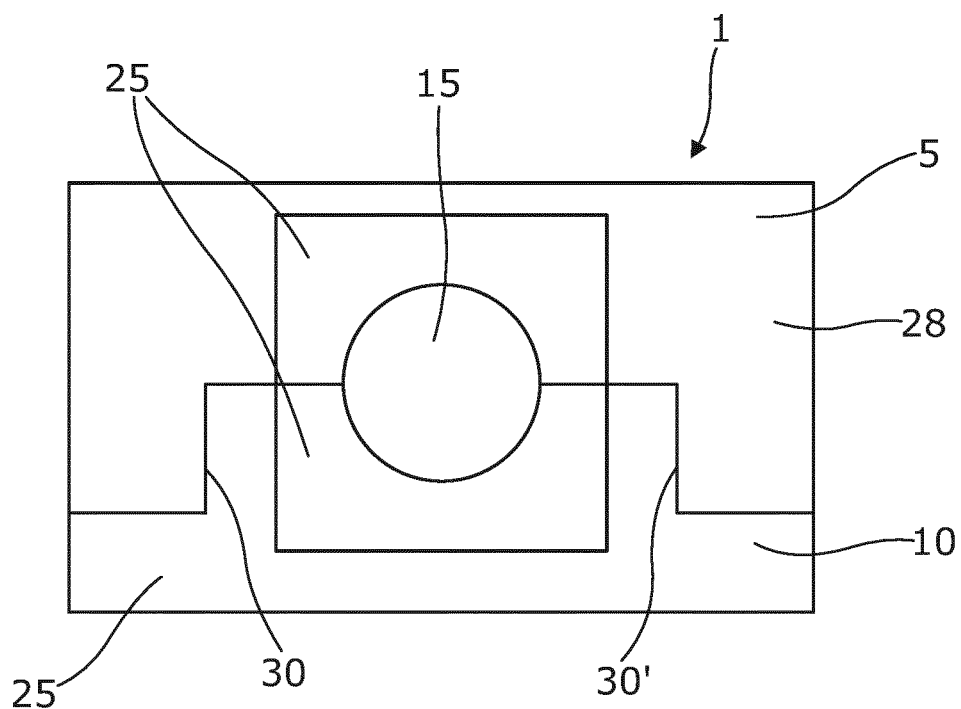
FIGS. 1a and 1b show the centre cross section of a tool for use in accordance with the present invention suitable for carrying out the method of forming a shaped article.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person. Like reference numerals in the drawings refer to like elements throughout.

Though the present application may tend to focus on the construction of multi-layered (RF) lens structures it will be appreciated that the techniques described herein are applicable to any multi-layered/multi-part assembly comprising (thermoplastic) parts and particularly complex shaped articles which would be difficult to manufacture by alternative means.

The methods in accordance with the present invention may be suitable for use in a broad range of applications including making: electronic or electromechanical sensors, actuators, solenoids, motors, acoustic sound dampening claddings and mounts, multi-material enclosures, power tool components and pharmaceutical components such as prosthetics, implants, drug delivery systems, applicators and catheters.

The methods in accordance with the present invention may be suitable for use in RF applications such as making: RF lenses (e.g. a Luneburg lens), retro-reflectors, RF waveguides, RF filters, RF resonators, metamaterial structures, refraction structures, diffraction structures, or scattering structures.

The tool for use in accordance with the present invention may be subjected to certain design parameters for controlling the balance of conditions within the tool cavity. The tool typically provides a sealed pressurised environment. Pressure serves to eliminate or reduce any gaps between parts in the assembly and hence the shaped article which is formed in accordance with the present invention, resulting from geometrical tolerances of the manufacturing process from which the parts were made, and to provide sufficient bond pressure to bring the parts into intimate contact and provide high strength chemical bonds. Preferably, material flow is reduced or even more preferably eliminated to preserve the geometry of the parts being welded and to control the geometry of the interfaces in the final shaped article which may be referred to herein as the welded assembly which is, after the welding process, one single object which can no longer be separated into its constituent parts. The assembly of non bonded parts before the welding process is performed is referred to herein as the assembly of parts.

The present inventors have found that optimum results may be achieved by using a welding temperature which is within ±5° C. of the melting temperature of the at least two parts. If parts are used of different materials (e.g. different polymers), then the melting point of the material possessing the highest melting point is used as the welding temperature (or a higher temperature). The temperature may be minimised to minimise expansion but should be high enough to adequately soften the parts to allow part interfaces to move together in an interference fit and, for the case when polymers are used, polymer chains to form the required chemical bond.

At the optimum weld temperature, the tool cavity may be scaled (typically uniformly in x, y and z directions) so as to be larger in volume than the room temperature volume of the assembly of parts. This is to prevent excessive pressure and leakage out of the cavity but also allows for the shaped article to be easily inserted into the tool cavity before welding and to shrink back from the cavity wall during cooling and re-solidification, releasing the shaped article cleanly from the walls of the cavity (eliminating flash contamination on the surface of the tool which would need to be cleaned before subsequent welding of another part) and allowing for easy removal of the welded assembly. Scaling ratios by a volume of about 0.5-6% are preferred, more preferably about 0.5-3%, even more preferably about 1-2%. These scaling ratios are suitable for use with parts made from Low Density Polyethylene (LDPE), Medium Density Polyethylene (MDPE), Linear Low Density Polyethylene (LLDPE), High Density Polyethylene (HDPE) and Polypropylene (PP). The optimum ratio may depend on the thermal expansion of the constituent parts (e.g. polymer), volume % loading of filler, thermal expansion of the filler material and the geometry of the part(s), the thermal expansion coefficient of the tool materials and the welding temperature (range).

The volume of the parts can be readily calculated from measurement of the part masses if the density of the materials used to make the parts (e.g. polymers) is known. The expansion rate of the materials may be measured using techniques such as thermal mechanical analysis.

When the welded assembly (i.e. the shaped article) is to be cooled, typically the outer surface temperature of the welded assembly will drop below the glass transition temperature, below the heat deflection temperature, or below the Vicat softening temperature before the welded assembly can be removed. To some extent this will be dependent on the nature of the (polymer) materials and the geometry of the welded assembly (or shaped article).

The heating time may be reduced by the use of any of inductive tool heating, contacting opposite surfaces (e.g. top and bottom) of the tool to heated elements, e.g. platens, heating the tool to a temperature higher than the weld temperature which will increase the rate of heat flow, or by using fluid channels within the tooling to allow for the use of Rapid Temperature Control (RTC) tooling (which typically uses circulating fluid, or pressurised steam to quickly heat and cool the tool), or by inserting pre-heated parts into pre-heated tools.

Welding time can be considered to be instantaneous once the heat has been conducted through the entire volume of the assembly of parts via the surface of the tool cavity through to the centre of the assembly of parts, such that the entire volume of the assembly of parts is at or above the required weld temperature. In reality, the welding process takes a finite time but this time is so much smaller than the required time for heat conduction so as to be considered instantaneous.

Reduced cooling time can be achieved by moving the tool to a refrigerated environment once the weld cycle is complete, immersing the tool in a cooling fluid, or via the use of RTC tooling. RTC tooling can significantly decrease cycle time at the expense of the energy required to provide the rapid changes in temperature.

Both the heating and cooling time can be reduced by designing the shaped article with a (central) cored hole through which a metal pin protruding from the tool cavity can be inserted during assembly of the tool and arranging the assembled parts. As the thermal conductivity of metals is significantly higher than that of polymers, this allows heat flow in from the centre of the assembly as well as the circumference and effectively reduces the distance over which the heat flows through a low thermal conductivity polymer.

To reduce manufacturing cost and facilitate the method being scalable to high volume manufacture (with, for example, many assemblies per minute being welded) then robotic assembly/disassembly of parts and tools may be used. Advantageously, the tool design concepts described herein are amenable to robotic manipulation. Conveyorised continuous ovens or paternoster ovens or RTC cooling may be used to allow high throughput. The method in accordance with the present invention is suitable for use in preparing shaped articles of any architecture and/or geometry.

A paternoster oven provides advantages in that each shelf can be designed with an integral clamping mechanism to provide tool closure forces for a stack of one or more tools. This oven may have a heating phase during raising of the stack of tools, followed by a cooling phase during the descent of the stack of tools.

The method in accordance with the present invention has a number of advantages in connection with the assembly of multi-part, complex shaped articles. All voids from mismatched part tolerances are eliminated or reduced during the welding process, meaning part tolerances can be relaxed, thus further reducing manufacturing costs. The method is insensitive to the number of parts and the architecture of the assembly or shaped article. This means equipment and factory lines do not need to specialise on one single product design (as is the case for example with multi-shot moulding and to a lesser extent other polymer welding techniques). This is helpful to reduce capital expenditure for multiple product lines or new product launches. Geometrical tolerances are also well controlled.

The method in accordance with the present invention is applicable to any assembly of thermoplastic parts in a range of industries where conventional polymer welding techniques, over-moulding, multi-shot moulding, or chemical adhesive bonding is found to have limitations. In particular, the method is well suited to thick assemblies, or assemblies of many parts which would otherwise require many assembly steps and multiple pieces of bespoke equipment and tooling. Another advantage of the present invention for thick assemblies is that the slow cooling rate, inherent in the process, leads to thorough annealing and growth of crystallites (in semi-crystalline polymers), giving rise to a reduction in residual stress and potential for changes in geometry and warpage in high service temperature environments.

The method in accordance with the present invention is well suited for use with functional polymer parts, which might be heavily loaded with any one or more of a range of filler materials including those which provide one or more of the following functions: dielectric, magnetic, conductive, antimicrobial, catalytic, high/low density as required, antimicrobial, catalytic, high/low modulus as required, or colour. Such heavily filled polymers would be difficult to weld using conventional polymer welding techniques.

The method in accordance with the present invention is also well suited for preparing complex, irregular and/or doubly curved shapes of varying section thickness which can be difficult to weld using conventional welding techniques. The shaped articles formed in accordance with the method of the invention may be suitable for use in a broad range of applications including in making: electronic or electromechanical sensors, actuators, solenoids, motors, acoustic sound dampening claddings and mounts, multi-material enclosures, power tool components and pharmaceutical components such as prosthetics, implants, drug delivery systems, applicators and catheters.

The methods in accordance with the present invention may be suitable for use in RF applications such as making: RF lenses (e.g. a Luneburg lens), retro-reflectors, RF waveguides, RF filters, RF resonators, metamaterial structures, refraction structures, diffraction structures, or scattering structures.

The tool for use in connection with the method of the present invention is preferably constructed of two parts with a split line to allow for opening and insertion of constituent parts and removal from the cavity of the shaped article. The split line may be in a form so it does not act as a leak path for molten material from the assembly of parts out of the tool cavity. A parallel faced butt joint may be used to eliminate leakage. The tool for use in connection with the method of the present invention may be constructed of more than two parts.

The two tool parts or halves (which may be designated as core and cavity) may be inserted in a press (e.g. a platen press) to provide the clamping force to maintain closure of the tool during welding. The present inventors have found that clamping forces of about 20 tonnes are adequate for a shaped article with an assembly area parallel to the plane of the split line of approximately 30 $cm^2$. The platens of the press can furthermore be heated (by electric elements or oil for example) to provide the tool heating required to bring the parts of the weld assembly up to the required temperature. Threaded bolts or bayonet fittings (which may be alternated) can be incorporated into the tool design to maintain the required closure force during the weld cycle. This has the advantage that the tools may be mobile and can be moved through a heat source such as a conveyorised oven. By way of example, M8 bolts (e.g. 8 in total) provide sufficient closure force for tool sizes up to about 150 mm diameter.

Another and preferred approach to seal the tool split line is to extend the bore of the cavity part of the tool. The core part of the tool may then form a piston which fits into the extended bore (for example an overlap of about 25 mm has been found to be adequate.) The material of the core/piston part of the tool is preferably chosen to have a higher thermal expansion than the material of the cavity/bore part of the tool. Preferably, aluminium is used for the piston/core and steel for the cavity/bore. At the weld temperature, the piston thus expands to close the gap between the two tool parts (or halves) and provides an interference seal which has been found to resist leakage from exceptionally high internal cavity pressures. The softer material of the core and cavity parts may be surface treated to ensure its surface hardness is similar to the harder material to prevent wear and damage to the piston/bore and extend the life of the tool. For example, aluminium pistons may be hard anodized. By using different materials, increased cavity pressures are obtainable resulting in improved bond strengths. Thermal expansion forces from the assembly of parts (which can act to open the tool) are easier to resist with this tool design. A simpler bayonet design or fewer bolts may be required as the cavity pressure does not apply directly against the tool closure forces.

Figure 1B:
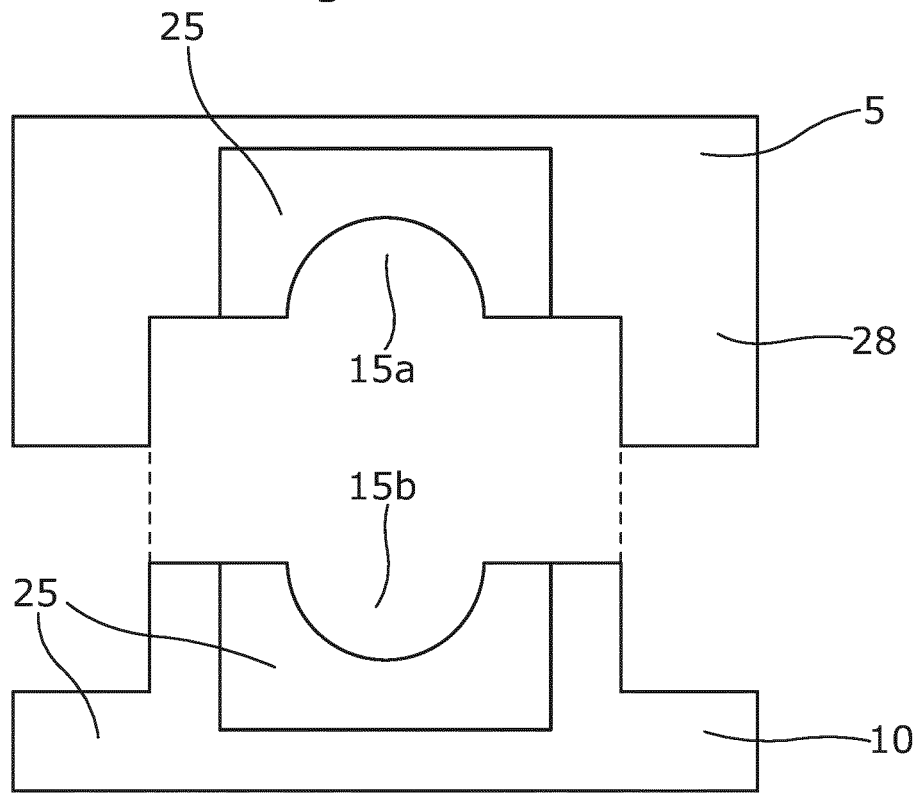

FIGS. 1a and 1b are schematic (cross-sectional) representations of a tool suitable for use in carrying out the method of forming a shaped article in accordance with the present invention. The tool represented generally in FIG. 1a at (1), comprises a first part indicated generally at (5) and a second part indicated generally at (10). The tool is shown in an open position in FIG. 1(b) and is essentially made from the two main parts (5, 10). In FIG. 1(a) a cavity is depicted at (15) formed by the two parts (5), (10) being brought together. In order to form the shaped article, at least two parts, e.g. filled thermoplastic polymer (not shown) are arranged in the cavity (15). The two parts of the cavity when the tool is an open position are indicated at (15a) and (15b). The at least two parts of the shaped article may be assembled in (15a) and/or (15b). In the embodiments depicted in FIGS. 1a and 1b, the tool is split to essentially form a core part and a piston part. The areas (25) may be made from material possessing a higher thermal expansion such as aluminium and the areas (28) may be made from a material possessing a lower thermal expansion such as steel. When the two main parts (5,10) are brought together in a heated environment a sealing face is formed between them indicated at (30, 30'), facilitated by the expansion of the material possessing a higher thermal expansion (25).

Figure 2:
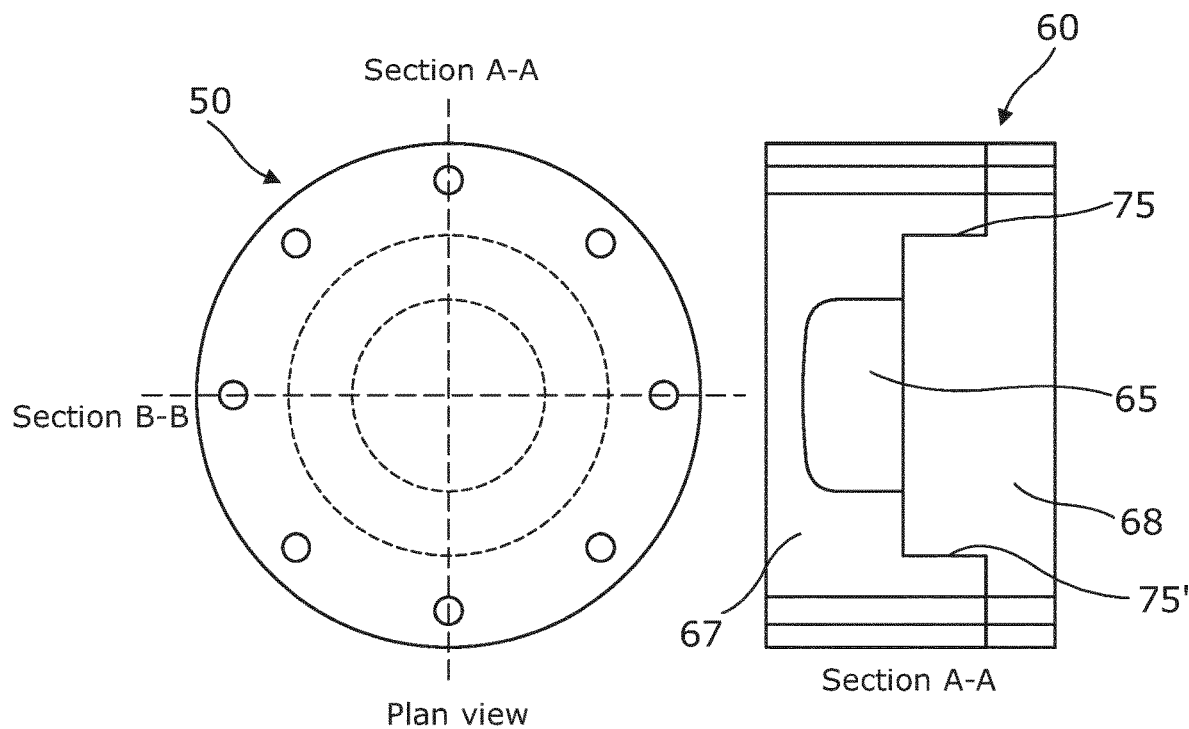
FIG. 2 shows an example of an assembly of parts in cross-section and an orthographic projection of the corresponding tool design in accordance with the present invention.
Figure 2:
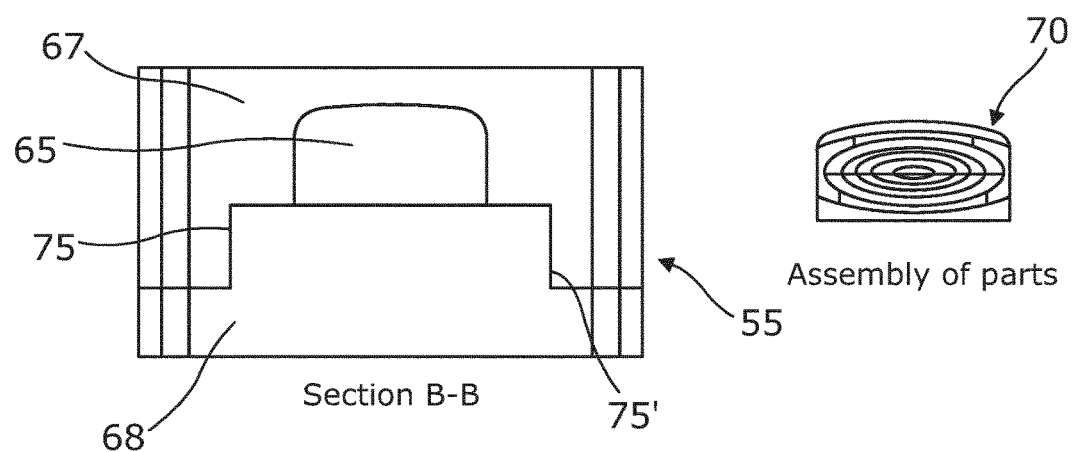

FIG. 2 shows an example of an assembly of parts in cross-section and an orthographic projection corresponding tool design in accordance with the present invention. In FIG. 2, a plan view of a tool design is shown generally at (50) and indicating the Section cuts at A-A and B-B. In Sections A-A and B-B indicated generally at (60) and (55) respectively, a cavity is depicted at (65). An assembly of parts is indicated generally at (70) which comprises a number of parts or layers. The assembly of parts indicated at (70) does not possess an undercut. The tool is essentially made from two parts (67, 68). The tool part (68) is preferably made from aluminium and the tool part, i.e. the bore (67) from steel. The tool part (68) forms a piston which slides inside the bore (67) and, owing to the higher thermal expansion of aluminium, forms an interference fit at faces (75) and (75') which provides a seal to contain the assembly of parts (70) inside the resulting cavity (65).

Figure 3:
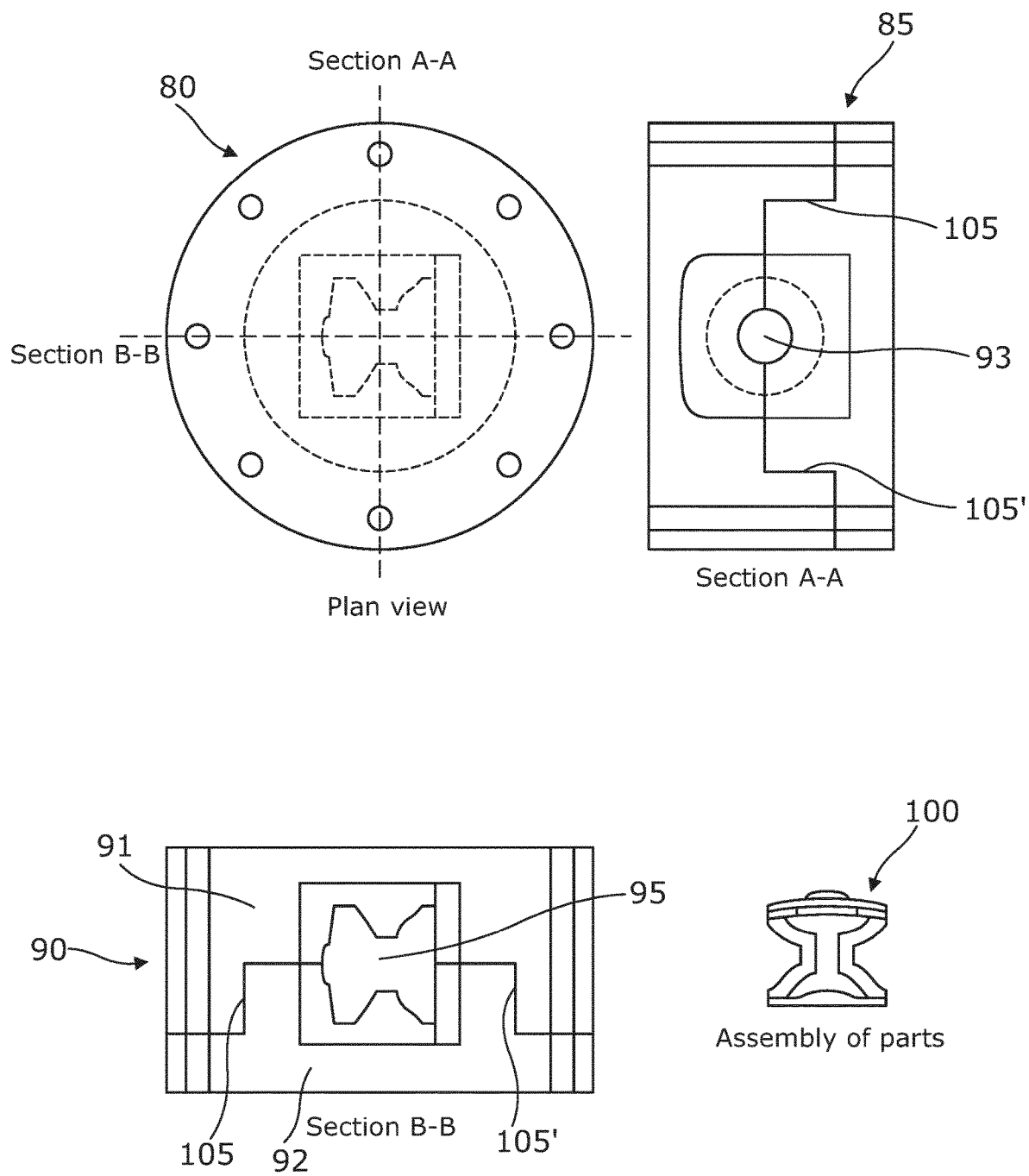
FIG. 3 shows an example of an assembly of parts in cross-section and an orthographic projection of the corresponding tool design in accordance with the present invention. The assembly of parts comprises an undercut and the corresponding modifications to the tool design are highlighted.

FIG. 3 shows an example of an assembly of parts in cross-section and an orthographic projection corresponding tool design in accordance with the present invention. In FIG. 3, a plan view of a tool design is shown generally at (80) and indicating the Section cuts at A-A and B-B. In Sections A-A and B-B indicated generally at (85) and (90) respectively, a cavity is depicted at (93) and (95) respectively. An assembly of parts is indicated generally at (100) which comprises a number of parts or layers. The assembly of parts indicated at (100) possesses an undercut. The tool is essentially made from two parts (91, 92). The tool part (92) is preferably made from aluminium and the tool part (91) from steel. Feature (92) forms a piston which slides inside the feature (91) which forms a bore and, owing to the higher thermal expansion of aluminium, forms an interference fit at faces (105) and (105') which provides a seal to contain the assembly of parts (100) inside the resulting cavity (93) and (95). The part is oriented such that the undercut in shape is aligned to the axis in which the piston (92) is moved in to the bore (91). Thus the tool can be disassembled with one axial motion and is amendable to automation by robot for example for an undercut geometry.

EXAMPLES

The part assembly geometry shown in FIG. 3 (100) was welded using the tool geometry shown in FIG. 3. The parts were constructed from compounds of LLDPE (Exxon Mobil LL6101) strontium titanate (Thermograde $SrTiO_3$ Grade E) varying from 18.6% to 1.7% by volume between different parts of the assembly. Compounds of alternate parts in the assembly structure were dyed using a small amount of chrome oxide colourant to provide optical contrast for post welding inspection and injection moulded on a Travin TP1 injection moulding press as separate parts prior to assembly. The parts were assembled and positioned in the tool cavity shown of tool half (92) by hand. The bore of tool half (91) was then positioned over the piston of tool half (92) and 8 M8 bolts tightened with a torque wrench to a torque value of 23 N/m to secure the two tool halves together. The tool assembly was then placed in a fan assisted box oven at a temperature of 130° C. for 4.5 hours. The assembly was removed from the oven after this time and allowed to cool in air for 60 minutes before being disassembled. Upon removal of tool half (91) from tool half (92), the welded assembly was revealed and all parts were found to be fully bonded to one another but not to the cavity surfaces, from which they had shrunk back from during cooling. Measurement of the diameter of the welded assembly at different angles showed the shaped article was concentric within a tolerance of +/−50 μm. The welded assembly was cut in half using a woodworking band saw and polished to the half diameter plane using a woodworking sanding wheel. The polished surface was then inspected using an optical scanner and the cross section geometry of the assembly laid over this image using CorelDraw 2D drawing software. The geometry was found to be within +/−200 microns of the nominal assembly geometry at all interfaces and the discrepancies seen were attributable to tolerance in the assembled moulded parts at the injection moulding stage due to polymer shrinkage.

The person skilled in the art realizes that the present invention is by no means limited to the preferred embodiments described above. On the contrary, many modifications and variations are possible within the scope of the appended claims.

Additionally, variations to the disclosed embodiments can be understood and effectuated by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain features are recited in mutually different dependent claims does not indicate that a combination of these features cannot be used to advantage.

The invention claimed is:

1. A method of forming a shaped article wherein said article comprises at least two parts which are bonded, the method comprising:
    assembling at least two parts in a cavity of a tool to form an assembly of the at least two parts, wherein the cavity is adapted to receive the assembly of at least two parts in the form of the shaped article;
    sealing the cavity of the tool to contain the assembly of the at least two parts inside the cavity and inhibit leakage from the cavity;
    wherein the tool comprises tool parts that define the cavity, and the tool parts comprise materials with different coefficients of thermal expansion such that the step of sealing the cavity of the tool is reversibly achieved by relative expansion of the tool parts in a heated configuration, whereby a sealed pressurised environment is created and the tool parts are fixedly fastened together and material flow is inhibited to preserve the geometry of the shaped article; and
    melting the assembly of at least two parts to bond the at least two parts together to form the shaped article.

2. The method according to claim 1, wherein the shaped article is cooled following bonding of the least two parts.

3. The method according to claim 1, wherein the cavity is shaped to match the outer surface profile of the assembly of the at least two parts.

4. The method according to claim 1, wherein the cavity is scaled to be larger in volume compared with the assembly of the at least two parts at about 20° C.

5. The method according to claim 1, wherein the cavity is scaled to be larger in volume compared with the assembly of the at least two parts at 20° C. by about 0.5-6 vol %.

6. The method according to claim 1, wherein the at least two parts are assembled to form an interface between the at least two parts and following melting the bond is formed across the entire interface.

7. The method according to claim 1, wherein pressure is exerted on the at least two parts by the tool cavity during formation of the bonded shaped article.

8. The method according to claim 1, wherein the tool parts enable access to the cavity and for the at least two parts to be assembled in the cavity and removed therefrom following formation of the bonded shaped article.

9. The method according to claim 1, wherein the at least two parts each possess different material properties for example any one or more of different permittivity properties, density, magnetic permeability, conductivity, antimicrobial, catalytic, modulus or colour.

10. The method according to claim 1, wherein the at least two parts are thermoplastic.

11. The method according to claim 1, wherein the at least two parts are polymer which may comprise a filler material.

12. The method according to claim 11, wherein the polymer is selected from one or more or any combination of polyethylene (PE), polypropylene (PP), Acrylonitrile Butadiene Styrene (ABS), Polyoxymethylene (POM), Poly (methyl methacrylate) (PMMA), Cyclic Olefin Copolymer (COC), Cyclic Olefin Polymer (COP), Ethylene Methacrylate (EMA), Ethylene tetrafluoroethylene (ETFE), Ethylene-vinyl acetate (EVA), Fluorinated ethylene propylene (FEP), Polycarbonate (PC), Liquid Crystal Polymer (LCP), Polyamide (PA), Polyaryletherketone (PAEK), polyamide-imide (PAI), Polybutylene succinate (PBS), Polybutylene terephthalate (PBT), Polyethylene terephthalate (PET), Polyether ether ketone (PEEK), Polyethylenimine (PEI), Polyetherketone (PEK), Polyethylene naphthalate (PEN), Polysulphone (PSU), Polyimide (PI), Poly (lactic acid) (PLA), polymethylpentene (PMP), Polyphenylene Ether (PPE), Polyphenylene sulphide (PPS), Polystyrene (PS), Polyvinyl chloride (PVC), Polyvinylidene fluoride (PVDF), Styrene acrylonitrile (SAN), or Thermoplastic polyurethane (TPU).

13. The method according to claim 11, wherein the polymer is selected from polyethylene and the polyethylene is selected from LDPE, or MDPE, or LLDPE or HDPE.

14. The method according to claim 11, wherein the amount of filler is 0.5 vol % to 60 vol % based on the volume of the filled polymer.

15. The method according to claim 11, wherein the at least two parts are in the form of layers.

16. The method according to claim 1, wherein at least one of the at least two parts possesses a doubly curved surface or an irregular shape.

17. The method according to claim 1, wherein the shaped article is selected from a radome, RF lens, Luneburg lens, retro-reflector, RF waveguide, RF filter, RF resonator, metamaterial structure, refraction structure, diffraction structure, scattering structure or forms a part thereof.

18. The method according to claim 1, wherein the shaped article is selected from an electronic or electromechanical sensor, actuator, solenoid, motor, acoustic sound dampening cladding and mounts, multi-material enclosure, power tool component, pharmaceutical components such as prosthetics, implants, drug delivery systems, applicators, catheters, or forms a part thereof.

19. The method according to claim 1, wherein the shaped article is an optical lens or an RF frequency lens.

\* \* \* \* \*